(12) United States Patent
Iwakawa

(10) Patent No.: US 10,215,916 B2
(45) Date of Patent: Feb. 26, 2019

(54) OPTICAL FIBER ROD, OPTICAL FIBER, IMAGE FIBER, AND METHOD FOR MANUFACTURING OPTICAL FIBER ROD

(71) Applicant: KURARAY CO., LTD., Kurashiki-shi (JP)

(72) Inventor: Ryuichi Iwakawa, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/539,271

(22) PCT Filed: Dec. 22, 2015

(86) PCT No.: PCT/JP2015/006372
§ 371 (c)(1),
(2) Date: Jun. 23, 2017

(87) PCT Pub. No.: WO2016/103675
PCT Pub. Date: Jun. 30, 2016

(65) Prior Publication Data
US 2017/0363805 A1    Dec. 21, 2017

(30) Foreign Application Priority Data

Dec. 25, 2014  (JP) .................................. 2014-262155

(51) Int. Cl.
*G02B 6/028* (2006.01)
*G02B 6/02* (2006.01)
(Continued)

(52) U.S. Cl.
CPC ...... *G02B 6/0288* (2013.01); *B29D 11/00682* (2013.01); *C03B 37/01214* (2013.01);
(Continued)

(58) Field of Classification Search
CPC .. G02B 6/0288; G02B 6/0365; G02B 6/0281; G02B 6/028
See application file for complete search history.

(56) References Cited

U.S. PATENT DOCUMENTS

| 5,048,923 A | 9/1991 | Tsumanuma et al. |
| 5,141,685 A * | 8/1992 | Maier ..................... B29C 70/58 |
| | | 264/210.6 |

(Continued)

FOREIGN PATENT DOCUMENTS

| JP | 2-291506 A | 12/1990 |
| JP | 5-224033 A | 9/1993 |

(Continued)

OTHER PUBLICATIONS

International Search Report dated Mar. 15, 2016 in PCT/JP2015/006372 filed Dec. 22, 2015.
(Continued)

*Primary Examiner* — Jennifer Doan
(74) *Attorney, Agent, or Firm* — Oblon, McClelland, Maier & Neustadt, L.L.P.

(57) ABSTRACT

An optical fiber rod (30) according to the present invention includes a center region (35), an outer region (31) formed around the center region (35), and an intermediate region (33) formed between the center region (35) and the outer region (31), and satisfies nA>nB>nC where nA is the refractive index of a material A produced by polymerization of a monomer ma, nB is the refractive index of a material B produced by polymerization of a monomer mb, and nC is the refractive index of a material C produced by polymerization of a monomer mc. The center region (35) is made of a material produced by polymerization of a monomer mixture containing the monomer ma, the outer region (31) is made of a material produced by polymerization of a monomer mixture containing the monomer mc, and the intermediate
(Continued)

region (33) is made of a material produced by polymerization of a monomer mixture containing the monomer mb. The refractive index decreases in the order: the center region (35)>the intermediate region (33)>the outer region (31).

14 Claims, 5 Drawing Sheets

(51) Int. Cl.
| | | |
|---|---|---|
| G02B 6/04 | (2006.01) | |
| B29D 11/00 | (2006.01) | |
| C03B 37/012 | (2006.01) | |
| G02B 6/036 | (2006.01) | |
| C08F 2/44 | (2006.01) | |
| C08F 265/04 | (2006.01) | |

(52) U.S. Cl.
CPC ........... *G02B 6/02* (2013.01); *G02B 6/02038* (2013.01); *G02B 6/0283* (2013.01); *G02B 6/036* (2013.01); *G02B 6/03633* (2013.01); *G02B 6/04* (2013.01); *C03B 2201/08* (2013.01); *C08F 2/44* (2013.01); *C08F 265/04* (2013.01)

(56) References Cited

U.S. PATENT DOCUMENTS

| | | |
|---|---|---|
| 6,071,441 A | 6/2000 | Koganezawa et al. |
| 6,529,665 B1 | 3/2003 | Yamashita et al. |
| 7,430,350 B1* | 9/2008 | LaForest .................. G02B 6/06 385/116 |
| 2007/0035721 A1* | 2/2007 | Toshikiyo ............ G02B 3/0087 356/73.1 |

FOREIGN PATENT DOCUMENTS

| | | |
|---|---|---|
| JP | 11-95045 A | 4/1999 |
| JP | 2000-28833 A | 1/2000 |
| JP | 2001-354711 A | 12/2001 |
| JP | 2008-20796 A | 1/2008 |
| WO | WO 98/40768 A1 | 9/1998 |
| WO | WO 02/052314 A1 | 7/2002 |

OTHER PUBLICATIONS

Extended European Search Report dated Jun. 6, 2018 in Patent Application No. 15872247.0, 9 pages.

* cited by examiner

OPTICAL FIBER ROD, OPTICAL FIBER, IMAGE FIBER, AND METHOD FOR MANUFACTURING OPTICAL FIBER ROD

TECHNICAL FIELD

The present invention relates to an optical fiber rod, an optical fiber, an image fiber, and a method for manufacturing an optical fiber rod.

BACKGROUND ART

Image fibers are widely used in the industrial field and the medical field. An image fiber has a structure in which a plurality of optical fibers are packed into a bundle and, in general, claddings of the optical fibers are fused so that a plurality of cores are formed in the cladding (see Patent Literature 4). The number of pixels (number of cores) of an image fiber is 1000 or more, for example, and not a few image fibers have 2000 to several tens of thousands of cores. The outside diameter of an image fiber is generally several mm or less. Therefore, the diameter of the core in an image fiber is on the order of μm.

A material used to form an image fiber is glass (see Patent Literature 1) or plastic (see Patent Literature 2). A plastic image fiber is more flexible than a glass image fiber. An example of a plastic optical fiber has a core made of polystyrene and a cladding made of acrylic (see Patent Literature 2), and another example of a plastic optical fiber has a core made of acrylic and a cladding made of acrylic fluoride (see Patent Literature 3).

The optical transmission loss of a plastic optical fiber does not cause a significant problem as long as the core diameter is about 1 mm. However, when the core diameter is several μm or less, the optical transmission loss of a plastic optical fiber is large, which presents a problem. Causes for such degradation of the transmission loss include a decrease in adhesion between the core and the cladding, and the interfacial structure mismatch between the core and the cladding. As one way to solve the adhesion and interfacial structure mismatch problems, a graded-index optical fiber (GI optical fiber) is known (see Patent Literatures 5 and 6).

CITATION LIST

Patent Literature

PTL1: Japanese Unexamined Patent Application Publication No. H2-291506
PTL2: Japanese Unexamined Patent Application Publication No. 2000-028833
PTL3: Japanese Unexamined Patent Application Publication No. H5-224033
PTL4: Japanese Unexamined Patent Application Publication No. 2008-20796
PTL5: Japanese Unexamined Patent Application Publication No. 2001-354711
PTL6: International Patent Publication No. 1998/040768

SUMMARY OF INVENTION

Technical Problem

In image fibers, the numerical aperture increases and the crosstalk decreases as a difference in refractive index between the core and the cladding increases. Therefore, an optical fiber to be used for an image fiber preferably has a largest possible difference in refractive index between the core and the cladding.

When, as materials of a plastic optical fiber, polystyrene is used for the core and acrylic fluoride is used for the cladding, for example, a difference in refractive index between the core and the cladding is about 0.15, which is relatively large. However, the adhesion between polystyrene and acrylic fluoride is not good enough. In this manner, as a difference in refractive index between the core and the cladding increases, the adhesion between the core and the cladding decreases, and the interfacial structure mismatch between the core and the clad increases, which causes an increase in the transmission loss of the optical fiber.

Further, in the case of a graded-index optical fiber, it is required to use materials that become transparent at a certain mixing ratio within a specified range, there are no many choices of materials to be used. Particularly, because materials with a large difference in refractive index often have the physical properties that are largely different from each other, the materials do not become transparent at a certain mixing ratio, and the range of a mixing ratio at which they become transparent is limited in many cases. Therefore, it is difficult for the graded-index optical fiber to increase a difference in refractive index between the core and the cladding.

The present invention has been accomplished to solve the above problem and an object of the present invention is thus to provide an optical fiber rod, an optical fiber, an image fiber, and an optical fiber rod manufacturing method with a large difference in refractive index between a core and a cladding and a small optical transmission loss.

Solution to Problem

An optical fiber rod according to the present invention includes a center region, an outer region formed around the center region, and an intermediate region formed between the center region and the outer region, wherein $nA > nB > nC$ is satisfied where nA is a refractive index of a material A produced by polymerization of a monomer ma, nB is a refractive index of a material B produced by polymerization of a monomer mb, and nC is a refractive index of a material C produced by polymerization of a monomer mc, the center region is made of a material produced by polymerization of a monomer mixture containing the monomer ma and not containing the monomer mc, the outer region is made of a material produced by polymerization of a monomer mixture containing the monomer mc and not containing the monomer ma, the intermediate region is made of a material produced by polymerization of a monomer mixture containing the monomer mb and not containing the monomer ma and the monomer mc, and a refractive index decreases in the order: the center region>the intermediate region>the outer region.

In the present invention, the optical fiber rod preferably includes a first copolymer region formed between the center region and the intermediate region, wherein the first copolymer region is made of a material produced by copolymerization of a monomer mixture containing the monomer ma and the monomer mb and not containing the monomer mc.

In the present invention, it is preferred that a refractive index of the first copolymer region continuously decreases from the center region side toward the intermediate region side.

In the present invention, the optical fiber rod preferably includes a second copolymer region formed between the intermediate region and the outer region, wherein the second copolymer region is made of a material produced by copolymerization of a monomer mixture containing the monomer mb and the monomer mc and not containing the monomer ma.

In the present invention, it is preferred that a refractive index of the second copolymer region continuously decreases from the intermediate region side toward the outer region side.

An optical fiber according to the present invention is manufactured by stretching the optical fiber rod described above.

An image fiber according to the present invention is manufactured by stretching a bundle of a plurality of optical fibers described above.

A method for manufacturing an optical fiber rod according to the present invention is a method for manufacturing an optical fiber rod including a center region, an outer region formed around the center region, and an intermediate region formed between the center region and the outer region, where a refractive index decreases in the order: the center region>the intermediate region>the outer region, and nA>nB>nC is satisfied where nA is a refractive index of a material A produced by polymerization of only a monomer ma, nB is a refractive index of a material B produced by polymerization of only a monomer mb, and nC is a refractive index of a material C produced by polymerization of only a monomer mc, the method including a step of forming the outer region by polymerization of a monomer mixture containing the monomer mc and not containing the monomer ma, a step of forming the intermediate region on an inside of the outer region by polymerization of a monomer mixture containing the monomer mb and not containing the monomer ma and the monomer mc, and a step of forming the center region on an inside of the intermediate region by polymerization of a monomer mixture containing the monomer ma and not containing the monomer mc.

Advantageous Effects of Invention

According to the present invention, it is possible to provide an optical fiber rod, an optical fiber, an image fiber, and an optical fiber rod manufacturing method with a large difference in refractive index between a core and a cladding and a small optical transmission loss.

DESCRIPTION OF EMBODIMENTS

[First Embodiment]

Embodiments of the present invention are described hereinafter with reference to the drawings.

Figure 1:
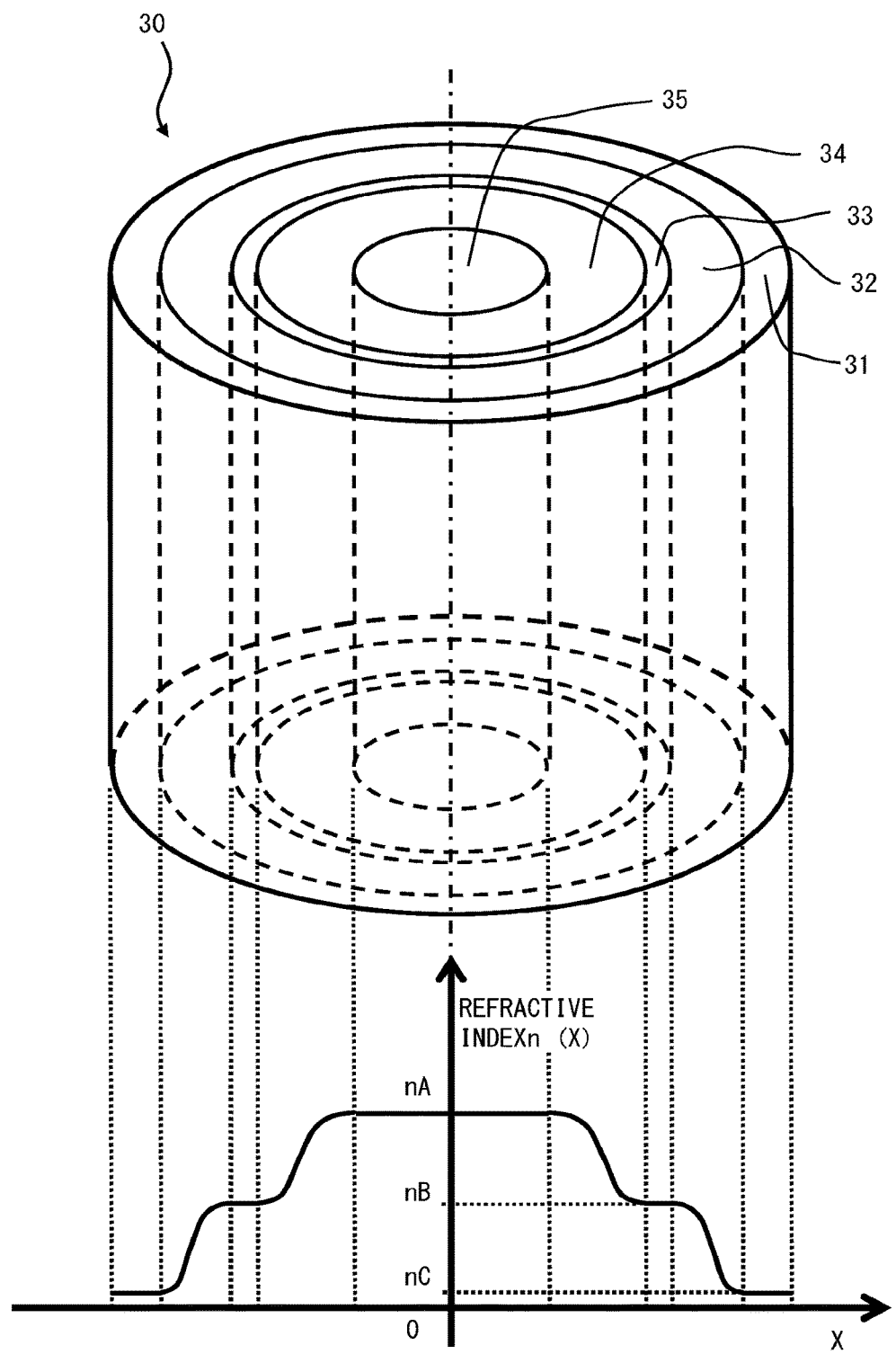
FIG. 1 is a view showing an example of the structure and the refractive index of each region of an optical fiber rod according to a first embodiment.

FIG. 1 is a view showing an example of the structure and the refractive index of each region of an optical fiber rod 30 according to this embodiment. The measurements shown in FIG. 1 do not always coincide with the scale of the rod 30 according to this embodiment. As shown in FIG. 1, the optical fiber rod 30 according to this embodiment includes a center region 35, a first copolymer region 34, an intermediate region 33, a second copolymer region 32, and an outer region 31.

The refractive index decreases in the order: the center region 35>the first copolymer region 34>the intermediate region 33>the second copolymer region 32>the outer region 31. The refractive index of the center region 35, the intermediate region 33 and the outer region 31 is uniform in each region. On the other hand, the refractive index of the first copolymer region 34 and the second copolymer region 32 varies in each region.

The optical fiber rod 30 is made of a material produced by the polymerization of a monomer mixture containing one or a plurality of monomers selected from a monomer ma, a monomer mb and a monomer mc. When the refractive index of a material A produced by the polymerization of only the monomer ma is nA, the refractive index of a material B produced by the polymerization of only the monomer mb is nB, and the refractive index of a material C produced by the polymerization of only the monomer mc is nC, the relationship of nA>nB>nC is satisfied.

When the optical fiber rod 30 is viewed along the cross-section perpendicular to the length direction (longitudinal direction), the center region 35 is formed near the center of the cross section. The center region 35 is made of a material produced by the polymerization of a monomer mixture containing the monomer ma and not containing the monomer mc. Hereinafter, the term "not containing a certain monomer" means not containing it to the degree that the refractive index of the region varies by the presence of that monomer, and that does not exclude containing trace amounts, like foreign substances, such as about 0.01 mass %, of the same.

The center region 35 corresponds to the core of the optical fiber. The center region 35 may be a polymer of a monomer mixture containing a monomer other than the monomer mc, such as the monomer mb, for example. Preferably, the material of the center region 35 is made of a polymer that is produced only from the monomer ma because the refractive index is higher and a difference in refractive index between the core and the cladding is larger in this case.

When the optical fiber rod 30 is viewed along the cross-section perpendicular to the length direction (longitudinal direction), the outer region 31 is formed around the center region 35, on the outer periphery of the optical fiber rod 30. The outer region 31 is made of a material produced by the polymerization of a monomer mixture containing the monomer mc and not containing the monomer ma.

The outer region 31 corresponds to the cladding of the optical fiber. The outer region 31 may be a polymer of a monomer mixture containing a monomer other than the monomer ma, such as the monomer mb, for example. Preferably, the material of the outer region 31 is made of a polymer that is produced only from the monomer mc because the refractive index is lower and a difference in refractive index between the core and the cladding is larger in this case.

The intermediate region 33 is formed between the center region 35 and the outer region 31. The intermediate region 33 is made of a material produced by the polymerization of a monomer mixture containing the monomer mb and not containing the monomer ma and the monomer mc. The intermediate region 33 may contain a monomer other than the monomer ma and the monomer mc. Further, the intermediate region 33 may be a polymer produced only from the monomer mb.

The first copolymer region 34 is formed between the center region 35 and the intermediate region 33. The first copolymer region 34 is made of a material produced by the copolymerization of a monomer mixture containing the monomer ma and the monomer mb and not containing the monomer mc.

The second copolymer region 32 is formed between the intermediate region 33 and the outer region 31. The second copolymer region 32 is made of a material produced by the copolymerization of a monomer mixture containing the monomer mb and the monomer mc and not containing the monomer ma.

For the monomer ma, it is preferred to use a radical polymerizable monomer with a benzene ring because the refractive index of the material A produced by the polymerization of the monomer ma is high and the transparency is high. Particularly, it is preferred to use benzyl methacrylate, styrene and phenylmethacrylate for high transparency, and it is preferred to use benzyl methacrylate and phenylmethacrylate for a relatively short polymerization time.

For the monomer mb, it is preferred to use an alkyl methacrylate monomer because the transparency is high, and methyl methacrylate (which is hereinafter referred to as MMA in some cases), ethyl methacrylate (which is hereinafter referred to as EMA in some cases) and the like are used. Methyl methacrylate or methylacrylate is referred to as methyl (meth)acrylate in some cases. It is preferred to use methyl methacrylate because the transparency of the material B produced by the polymerization of only the monomer mb is high.

For the monomer mc, it is preferred to use 2,2,2-trifluoroethyl methacrylate (which is hereinafter referred to as 3FMA in some cases), 2,2,3,3-tetrafluoropropyl methacrylate (which is hereinafter referred to as 4FMA in some cases) and the like because the refractive index of the material C produced by the polymerization of the monomer mc is low and the transparency is high.

The refractive index of the material A is preferably from 1.45 to 1.70. If the refractive index of the material A is lower than 1.45, a difference in refractive index between the material A and the material C cannot be large enough in some cases. If the refractive index of the material A is higher than 1.70, the transparency of the material A is likely to be insufficient, and the degree of freedom to choose a material is likely to be low. More preferably, the refractive index of the material A is from 1.50 to 1.65.

The refractive index of the material C is preferably from 1.35 to 1.55. If the refractive index of the material C is lower than 1.35, the transparency of the material C is likely to be insufficient, and the degree of freedom to choose a material is likely to be low. If the refractive index of the material C is higher than 1.55, a difference in refractive index between the material A and the material C cannot be large enough in some cases. More preferably, the refractive index of the material C is from 1.40 to 1.50.

The refractive index of the material B is preferably different from the refractive index of the material A by 0.05 or more and more preferably 0.06 or more, and is preferably different from the refractive index of the material C by 0.05 or more and more preferably 0.06 or more. In this range, the degree of freedom to choose a material is relatively high.

It is preferred to use a combination where the monomer ma is benzyl methacrylate, the monomer mb is methyl (meth)acrylate, and the monomer mc is 2,2,3,3-tetrafluoropropyl methacrylate. This is because the transparency of a copolymer of the monomer ma and the monomer mb is high and the transparency of a copolymer of the monomer mb and the monomer mc is high.

In the optical fiber rod 30 according to this embodiment, because the intermediate region 33 is formed between the center region 35 and the outer region 31, it is possible to achieve a large difference in refractive index between the center region 35 and the outer region 31 and maintain a small a difference in refractive index between the center region 35 and the intermediate region 33 and a small difference in refractive index between the outer region 31 and the intermediate region 33. This increases the degree of freedom to choose materials to be used as the monomer ma, the monomer mb and the monomer mc.

An optical fiber rod having the structure in which the center region 35 is made of the material A and the outer region 31 is made of the material C and the intermediate region 33 is not formed can be manufactured. By stretching this optical fiber rod, it is possible to manufacture an optical fiber with a large difference in refractive index between the core and the cladding. However, for a combination of materials with a large difference in refractive index between the core and the cladding, the adhesion between the core and the cladding tends to decrease. When debonding occurs at the interference between the core and the cladding, the optical performance of the optical fiber is deteriorated.

There is a possibility that the problem of deterioration of the optical performance can be improved when the intermediate region 33 is made of a copolymer produced from the monomer ma and the monomer mc. However, as a difference in refractive index between the monomer ma and the monomer mc is larger, the transparency of the copolymer tends to decrease.

The optical fiber rod 30 according to this embodiment has the intermediate region 33 that contains the monomer mb and does not contain the monomer ma and the monomer mc. A difference in refractive index between the material A and the material B and a difference in refractive index between the material B and the material C can be thereby relatively low, and it is thus possible to avoid a combination of monomers in which the transparency of a copolymer is deteriorated, thereby improving the problem of interface debonding.

The optical fiber rod 30 according to this embodiment preferably has the first copolymer region 34 between the center region 35 and the intermediate region 33. It is thereby possible to reduce the possibility of debonding at the interference between the center region 35 and the first copolymer region 34 and the interference between the first copolymer region 34 and the intermediate region 33. Further, it is possible to avoid a combination of monomers in which the transparency of a copolymer is deteriorated.

The optical fiber rod 30 according to this embodiment preferably has the second copolymer region 32 between the intermediate region 33 and the outer region 31. It is thereby possible to reduce the possibility of debonding at the interference between the intermediate region 33 and the second copolymer region 32 and the interference between the second copolymer region 32 and the outer region 31. Further, it is possible to avoid using a combination of monomers in which the transparency of the copolymer is deteriorated.

The value of the refractive index from the center region 35 to the intermediate region 33 preferably varies in a continuous manner. The refractive index of the first copolymer region 34 is equal to the refractive index nA of the center region 35 in a part near the center region 35, continuously decreases from the center region 35 side toward the intermediate region 33 side, and is equal to the refractive index nB of the intermediate region 33 in a part near the intermediate region 33.

Further, the value of the refractive index from the intermediate region 33 to the outer region 31 preferably varies in a continuous manner. The refractive index of the second copolymer region 32 is equal to the refractive index nB of the intermediate region 33 in a part near the intermediate region 33, continuously decreases from the intermediate region 33 side toward the outer region 31 side, and is equal to the refractive index nC of the outer region 31 in a part near the outer region 31. In this structure, it is possible to more effectively prevent debonding at the interference between the regions. Further, it is possible to suppress the transmission loss of the optical fiber caused by the interfacial structure mismatch.

In the optical fiber rod 30 according to this embodiment, when the value of the refractive index "varies in a continuous manner", it means that {df(X)/dX} is a continuous function where X is the distance in the direction perpendicular to the length direction (longitudinal direction) of the optical fiber rod 30, and f(X) is the value of the refractive index in the distance X. In this embodiment, when [difference in refractive index]≤{(the maximum refractive index in the center region 35)−(the minimum refractive index in the intermediate region 33)}×0.01 is satisfied, it is regarded as "the refractive index is the same".

Therefore, when {(refractive index value when ΔX is close to 0 at X1+ΔX)−(refractive index value when ΔX is close to 0 at X1−ΔX)}≤{(the maximum refractive index in the center region 35)−(the minimum refractive index in the intermediate region 33)}×0.01 is satisfied, a variation in the refractive index is regarded as continuous at the point (X1). Note that, in the above equation, ΔX>0. When a difference in refractive index at the point (X1) becomes larger than the value on the right-hand side of the above equation, the distribution of the refractive index in the X direction is regarded as discontinuous. The value of the refractive index from the intermediate region 33 to the outer region 31 is considered in the same way.

In the optical fiber rod 30 according to this embodiment, the center region 35 can be regarded as the core, the outer region 31 as the cladding, and the intermediate region 33, the first copolymer region 34 and the second copolymer region 32 as transition regions between the core and the cladding. Note that, however, when the value of the refractive index varies in a continuous manner, the boundary between the regions is unclear in some cases. The definition of the size of the core and the cladding in the case where the refractive index varies in a continuous manner and the boundary is unclear is described hereinbelow.

In this embodiment, when the maximum value of the refractive index in the center region 35 is nMAX, the range where the refractive index is from nMAX−0.001 to nMAX is the center region 35, which corresponds to the core. Note that nMAX=nA in this embodiment.

In this embodiment, when the minimum value of the refractive index in the outer region 31 is nMIN, the range where the refractive index is from nMIN to nMIN+0.001 is the outer region 31, which corresponds to the cladding. Note that nMIN=nC in this embodiment.

In this embodiment, the value of the refractive index in the intermediate region 33 is nB.

Further, one or more of the center region 35, the first copolymer region 34, the intermediate region 33, the second copolymer region 32 and the outer region 31 may be a region that contains one or more types of monomer, such as a monomer md, for example, other than the monomer ma, the monomer mb and the monomer mc.

Note that, however, when four or more types of monomers are contained, a monomer where the refractive index of a polymer produced only from that monomer is the highest is the monomer ma, and a monomer where the refractive index of a polymer produced only from that monomer is the lowest is the monomer mc. Thus, the refractive index nD of the monomer md is lower than nA and higher than nC. Further, a monomer which is other than the monomer ma and the monomer mc and which has the highest weight ratio on a monomer basis in the rod 30 is the monomer mb. Thus, the weight ratio of the monomer md is the lowest.

When the diameter of the optical fiber rod 30 according to this embodiment is 100, the diameter of the center region 35 is preferably 40 to 80, and more preferably 50 to 70. If the diameter of the center region 35 is less than 40, the proportion of the area of the center region 35 to the area of the optical fiber rod 30 is small, and there is a possibility that the area ratio of the core of the optical fiber is too small. If, on the other hand, the diameter of the center region 35 is more than 80, the proportion of the area of the center region 35 to the area of the optical fiber rod 30 is large, and there is a possibility that the intermediate region 33 and the outer region 31 are not wide enough.

When the diameter of the optical fiber rod 30 according to this embodiment is 100, the width of the outer region 31 is preferably 5 to 55, more preferably 5 to 20, and still more preferably 7 to 15. If the width of the outer region 31 is less than 5, the cladding is too small when an image fiber is produced, which can cause a problem in crosstalk performance. If, on the other hand, the width of the outer region 31 is more than 55, there is a possibility that the center region 35 and the intermediate region 33 are not wide enough.

When the diameter of the optical fiber rod 30 according to this embodiment is 100, the width of the intermediate region 33 is preferably 0.5 to 5, more preferably 0.7 to 3, and still more preferably 0.7 to 2.5. If the width of the intermediate region 33 is less than 0.5, there is a possibility that both of the monomer ma and the monomer mc are mixed into a region that should be the intermediate region 33 due to fluctuation in a process of manufacture or the like, which makes the region opaque. If, on the other hand, the width of the intermediate region 33 is more than 5, there is a possibility that the center region 35 and the outer region 31 are not wide enough.

Although the intermediate region 33 may be placed at any position between the center region 35 and the outer region 31, it is preferably at the same distance from those two regions. Stated differently, the intermediate region 33 is preferably at the midpoint between the outermost periphery of the center region 35 and the innermost periphery of the outer region 31. If the intermediate region 33 is closer to one of those two regions, it is difficult to form the first copolymer region 34 or the second copolymer region 32 in some cases.

Note that, a line that passes through the central axis of the optical fiber rod 30 in the cross-section perpendicular to the length direction of the rod 30 intersects with the two outer regions 31, i.e., one outer region 31 and another outer region 31 on the opposite side with respect to the central axis. The above-described width of the outer region 31 indicates the width of one outer region 31, not the total width of the two outer regions 31. The same applies to the width of the intermediate region 33.

By heating and stretching the optical fiber rod 30 according to this embodiment, it is possible to manufacture a plastic optical fiber with a large difference in refractive index between the core and the cladding.

By packing a plurality of plastic optical fibers into a bundle and stretching the bundle, it is possible to manufacture a plastic image fiber. The plastic image fiber has a large difference in refractive index between the core and the cladding, and it is thereby possible to reduce crosstalk.

In the optical fiber rod 30, a covering layer made of a thermoplastic resin may be formed on the outside of the outer region 31. However, in the case of manufacturing a plastic image fiber by using a plastic optical fiber manufactured by stretching the optical fiber rod 30, the proportion of the total area of a plurality of cores to the cross-section of the image fiber is small. Therefore, the outer region 31 is preferably placed on the outermost part of the optical fiber rod 30.

<Method for Manufacturing Optical Fiber Rod>

In an example of a method of manufacturing the optical fiber rod 30 according to this embodiment, a pipe B that is made of a material B is placed inside a pipe C that is made of a material C, and a pipe A that is made of a material A is further placed inside the pipe B.

In another example of a method of manufacturing the optical fiber rod 30 according to this embodiment, using a rotating centrifugal force of a cylindrical reaction container, monomers are stacked atop each other sequentially toward the inner side, changing the composition of the monomers continuously or intermittently. Particularly, by continuously changing the composition of the monomers, it is possible to more effectively prevent debonding at the interference between two of the center region 35, the intermediate region 33 and the outer region 31. It is also possible to suppress the transmission loss caused by the interfacial structure mismatch. In yet another example, monomers may be stacked atop each other sequentially toward the inner side, turning a cylindrical body made of a thermoplastic resin corresponding to the outer region 31 around, instead of the above-described cylindrical container.

<Method for Manufacturing Optical Fiber>

Using the optical fiber rod 30 produced by combining pipes, an optical fiber can be manufactured by evacuating the pipe C and then heating and stretching it, for example, so that the pipe C, the pipe B, the pipe A or the rod A are brought into intimate contact with each other.

Figure 3:
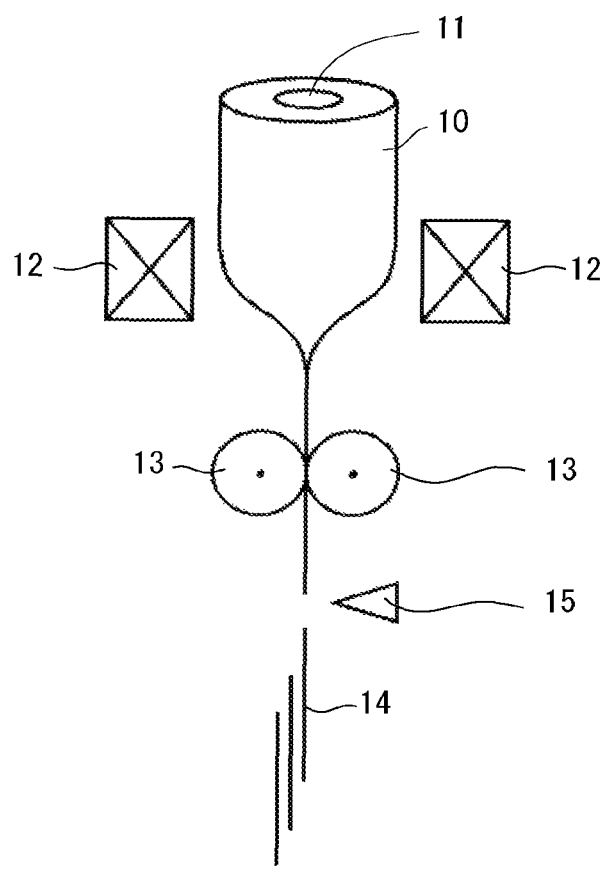
FIG. 3 is a view showing a method of manufacturing an optical fiber from the optical fiber rod according to the first embodiment.

Using a pipe 10, which is the optical fiber rod 30 produced by feeding monomers to the inside of a cylindrical body and polymerizing and stacking them, an optical fiber 14 can be manufactured by heating the pipe 10 by a furnace 12 and stretching it by a roller 13 as shown in FIG. 3.

<Method for Manufacturing Image Fiber>

Figure 4:
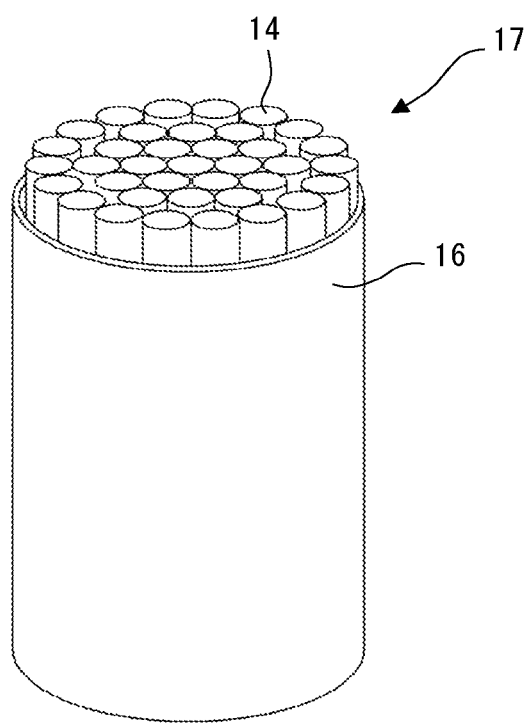
FIG. 4 is a view showing a method of manufacturing a bundle by packing a plurality of optical fibers according to the first embodiment.
Figure 5:
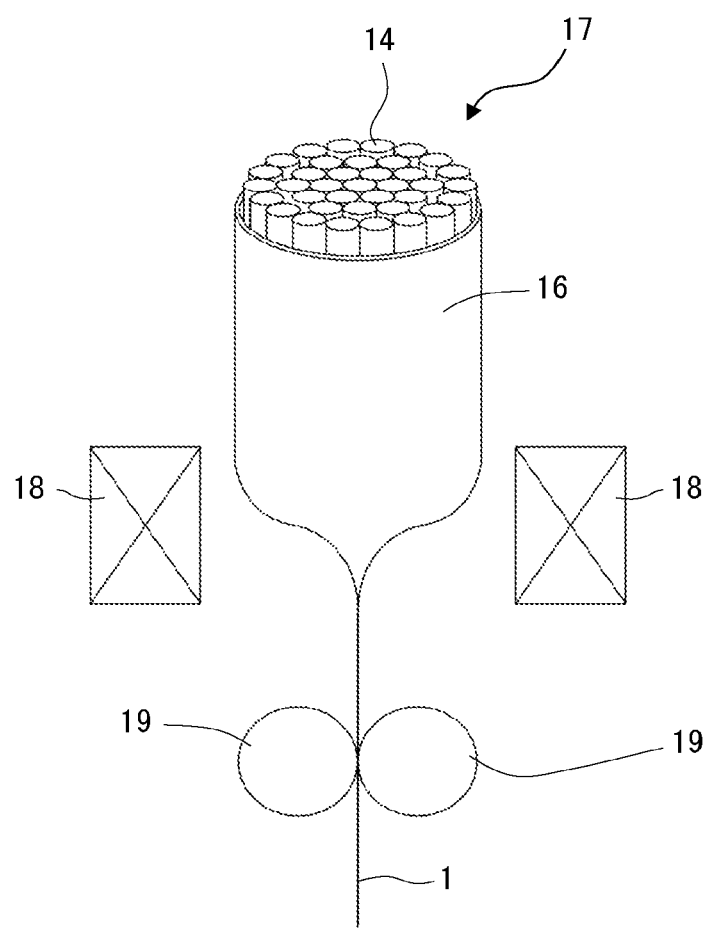
FIG. 5 is a view showing a method of manufacturing an image fiber from a bundle of optical fibers according to the first embodiment.

A bundle 17 is produced by packing a plurality of optical fibers 14 according to this embodiment together and inserting them into a pipe 16 made of polymethylmethacrylate as shown in FIG. 4. An image fiber 1 according to this embodiment can be manufactured by heating the bundle 17 by a furnace 18 and stretching it by a roller 19 as shown in FIG. 5.

Specifically, a plurality of optical fibers 14 are placed so that they are aligned in parallel inside the polymethylmethacrylate pipe 16 that is made of a transparent thermoplastic resin, the polymethylmethacrylate pipe 16 is evacuated, and then heated and stretched. The polymethylmethacrylate pipe 16 and the optical fibers 14 are thereby brought into intimate contact with each other, thereby producing the image fiber 1.

Figure 2:
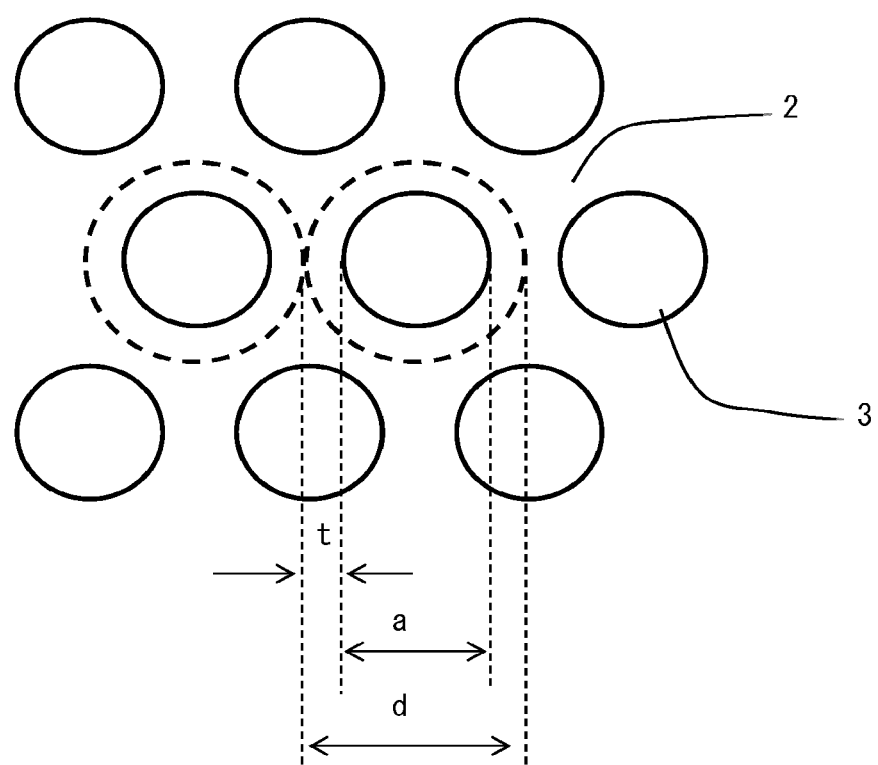
FIG. 2 is a view showing the placement of a plurality of cores in a cladding in an image fiber according to the first embodiment.

The image fiber 1 according to this embodiment that is produced by the above-described method has a sea-island structure as shown in FIG. 2, and a plurality of cores 3 are placed separately from one another in the cladding 2 which is one continuous form. In the image fiber 1 according to this embodiment, each of the stretched optical fibers 14 serves as one pixel. In FIG. 2, the pixel size is indicated by a diameter d. In FIG. 2, the size of the core 3 in one pixel indicated by a diameter a. In FIG. 2, the size of the cladding 2 in one pixel is indicated by a width t, and the distance between the two adjacent cores 3 is twice the value t.

In the plastic image fiber 1 according to this embodiment, the number of cores 3 is two or more. The number of cores 3 is preferably 1000 or more, and more preferably 2000 or more. There is no particular upper limit to the number of cores 3. Presently, the upper limit is about 50000. However, the upper limit of the number of cores 3 would increase with the advance in technology.

In the plastic image fiber 1 according to this embodiment, the diameter a of the core a is preferably 1 µm or more, and more preferably 1.5 µm or more. At the present day, the diameter a of the core a is 2 µm or more in reality. If the diameter a of the core a is less than 1 µm, there is a high possibility of pixel defects due to minute foreign matters mixed during a production time.

In the plastic image fiber 1 according to this embodiment, the diameter a of the core a is preferably 20 µm or less. The diameter a of the core a is more preferably 15 µm or less, and still more preferably 10 µm or less. If the diameter a of the core a is more than 20 µm, there is a possibility that an image is not fine enough.

The width t of the cladding 2 is preferably 0.2 µm or more, and more preferably 0.3 µm or more. Still more preferably, it is 0.4 µm or more. If the width t is less than this range, there is a high possibility of pixel defects due to minute foreign matters mixed during a production time. There is also a possibility of an increase in crosstalk. The width t of the cladding is preferably 2 µm or less, more preferably 1.5 µm or less, and still more preferably 1 µm or less. When the width t is more than this range, the proportion of the area of the core 3 to the cross-section of the image fiber 1 is small, and there is a possibility that an image is not bright enough.

The outside diameter of the image fiber 1 according to this embodiment is preferably 4 mm or less. The outside diameter of the image fiber 1 is more preferably 3 mm or less, and still more preferably 2 mm or less. Particularly preferably, the outside diameter of the image fiber 1 is 1.5 mm or less. If the outside diameter of the image fiber 1 is more than 4 mm, there is a possibility that the image fiber 1 is lack of flexibility and difficult to handle.

The outside diameter of the image fiber 1 according to this embodiment is preferably 0.2 mm or more, and more preferably 0.3 mm or more. If the outside diameter of the image fiber 1 is less than 0.2 mm, any one or more of the number of pixels, the diameter a of the core 3, the width t of the cladding 2 are too small, and there is a possibility that the fineness, brightness and the like of an image are not high enough.

EXAMPLE

Specific examples of this embodiment are described hereinafter. Note that, however, this embodiment is not limited to the following examples. Various modified examples and application examples are included in this embodiment as long as the feature of this embodiment is not significantly impaired.

Example 1

<Method for Manufacturing Optical Fiber Rod>

A glass cylindrical container (with an inside diameter of 100 mm) was placed horizontally in an air thermostat bath at a temperature of 70° C. The cylindrical container rotated (500 turns per minute). The rotational axis and the central axis of the cylindrical container coincided. Under such conditions, a mixture was injected through an inlet at one end of the cylindrical container in the length direction. This mixture was a mixture of a polymerization initiator, a chain transfer agent for molecular weight regulation, and a low refractive index monomer (2,2,3,3-tetrafluoropropyl methacrylate: the refractive index of the polymer was 1.422).

The rate of injection of the mixture was adjusted so that the rate of deposition of a polymer was 1 mm per hour. After injection, the cylindrical container continued to rotate for three hours. After that, heating (at a temperature of 120° C. for three hours) was done. As a result, the outer region 31 made of a polymer produced only from the low refractive index monomer was formed with a thickness of 10 mm on the inner periphery of the cylindrical container.

Then, a different type of a mixture was injected through the inlet in the same way as the process of forming the outer region 31. This mixture was a mixture of a polymerization initiator, a chain transfer agent for molecular weight regulation, a low refractive index monomer (2,2,3,3-tetrafluoropropyl methacrylate: the refractive index of the polymer was 1.422), and an intermediate refractive index monomer (methyl methacrylate: the refractive index of the polymer was 1.492). As a result, the second copolymer region 32 made of a polymer produced from the low refractive index monomer and the intermediate refractive index monomer was formed with a thickness of 4 mm on the inner periphery of the outer region 31.

As for the mixing ratio of the low refractive index monomer and the intermediate refractive index monomer in the second copolymer region 32, the ratio of the low refractive index monomer was higher in the outer part, and the ratio of the intermediate refractive index monomer was higher in the inner part. The intermediate refractive index monomer was not contained in a part adjacent to the outer region 31, the low refractive index monomer was not contained in the innermost part of the second copolymer region 32, and the mixing ratio of the monomers in the second copolymer region 32 varied continuously.

Then, a different type of a mixture was injected through the inlet in the same way as the above-described process. This mixture was a mixture of a polymerization initiator, a chain transfer agent for molecular weight regulation, and an intermediate refractive index monomer (methyl methacrylate: the refractive index of the polymer was 1.492). As a result, the intermediate region 33 made of a polymer produced only from the intermediate refractive index monomer was formed with a thickness of 2 mm on the inner periphery of the second copolymer region 32.

Then, a different type of a mixture was injected through the inlet in the same way as the above-described process. This mixture was a mixture of a polymerization initiator, a chain transfer agent for molecular weight regulation, an intermediate refractive index monomer (methyl methacrylate: the refractive index of the polymer was 1.492), and a high refractive index monomer (benzyl methacrylate: the refractive index of the polymer was 1.566). As a result, the first copolymer region 34 made of a polymer produced from the intermediate refractive index monomer and the high refractive index monomer was formed with a thickness of 4 mm on the inner periphery of the intermediate region 33.

As for the mixing ratio of the intermediate refractive index monomer and the high refractive index monomer in the first copolymer region 34, the ratio of the intermediate refractive index monomer was higher in the outer part, and the ratio of the high refractive index monomer was higher in the inner part. The high refractive index monomer was not contained in a part adjacent to the intermediate region 33, the intermediate refractive index monomer was not contained in the innermost part of the first copolymer region 34, and the mixing ratio of monomers varied continuously.

Then, a different type of a mixture was injected through the inlet in the same way as the above-described process. This mixture was a mixture of a polymerization initiator, a chain transfer agent for molecular weight regulation, and a high refractive index monomer (benzyl methacrylate: the refractive index of the polymer was 1.566). As a result, the center region 35 made of a polymer produced only from the high refractive index monomer was formed with a thickness of 28 mm on the inner periphery of the first copolymer region 34.

After that, the whole cylindrical container was cooled down to a room temperature, and then the cylindrical container was broken to take out the pipe 10. Because the cylindrical container was made of glass, it was easy to break it. The pipe 10 had a cylindrical shape with an outside diameter of 100 mm and an inside diameter of 4 mm, and it was made of materials of the polymer.

By the above process, the pipe 10, which is the optical fiber rod 30, having the outer region 31 made of the polymer produced only from the low refractive index monomer (2,2,3,3-tetrafluoropropyl methacrylate) with a refractive index of 1.422, the intermediate region 33 made of the polymer produced only from the intermediate refractive index monomer (methyl methacrylate) with a refractive index of 1.492, and the center region 35 made of the polymer produced only from the high refractive index monomer (benzyl methacrylate) with a refractive index of 1.566, sequentially from the outside, was manufactured. The pipe 10 was transparent in whole.

<Method for Manufacturing Optical Fiber>

FIG. 3 is a view showing a method of manufacturing the optical fiber 14 and the image fiber 1 from the pipe 10, which is the optical fiber rod 30 according to the first embodiment. As shown in FIG. 3, the pipe 10, which is the optical fiber rod 30, was heated and stretched, thereby manufacturing the plastic optical fiber 14 according to this example.

First, the end of the pipe 10 was heated by the furnace 12. A cavity 11 of the pipe 10 was decompressed at this time. The pipe 10 was then pressed between the rollers 13 and 13, and drawing was done. The outside diameter of the obtained optical fiber 14 was 1 mm. The optical fiber 14 was cut into pieces with a length of 300 mm each by a cutter 15.

The cavity 11 disappeared in the optical fiber 14. The diameter of the core of the optical fiber 14 was 600 µm. The thickness of the cladding of the optical fiber 14 was 100 µm. Thus, the total thickness of the first copolymer region 34, the second copolymer region 32 and the intermediate region 33 on one side with respect to the central axis was 100 µm.

<Method for Manufacturing Image Fiber>

As shown in FIGS. 4 and 5, the bundle 17 produced by packing a plurality of optical fibers 14 according to this example was heated and stretched, thereby manufacturing the plastic image fiber 1 according to this example.

As shown in FIG. 4, 7900 optical fibers 14 were inserted into the transparent polymethylmethacrylate pipe 16 (with an outside diameter of 100 mm and a thickness of 2 mm), thereby obtaining the bundle 17.

As shown in FIG. 5, the polymethylmethacrylate pipe 16 was decompressed, and the end of the bundle 17 was heated by the furnace 18. The bundle 17 was pressed between the rollers 19 and 19, and drawing was done. The plastic image fiber 1 was thereby obtained. The outside diameter of the image fiber 1 was 500 μm, the pixel diameter was 5 μm, the core diameter was 3 μm, and the cladding thickness was 0.5 μm. Thus, the total thickness of the first copolymer region 34, the second copolymer region 32 and the intermediate region 33 on one side with respect to the central axis was 0.5 μm.

Comparative Example 1

<Method for Manufacturing Optical Fiber Rod>

A method for manufacturing an optical fiber rod according to a comparative example 1 is described hereinafter. A glass cylindrical container (with an inside diameter of 100 mm) was placed horizontally in an air thermostat bath at a temperature of 70° C. The cylindrical container rotated (500 turns per minute). Under such conditions, a mixture was injected through an inlet at one end of the cylindrical container in the length direction. This mixture was a mixture of a polymerization initiator, a chain transfer agent for molecular weight regulation, and an intermediate refractive index monomer (methyl methacrylate: the refractive index of the polymer was 1.492).

The rate of injection of the mixture was adjusted so that the rate of deposition of a polymer was 1 mm per hour. After injection, the cylindrical container continued to rotate for three hours. After that, heating (at a temperature of 120° C. for three hours) was done. As a result, the outer region 31 made of a polymer produced only from the intermediate refractive index monomer was formed with a thickness of 10 mm on the inner periphery of the cylindrical container.

Then, a mixture was injected through the inlet in the same way as the process of forming the outer region 31. This mixture was a mixture of a polymerization initiator, a chain transfer agent for molecular weight regulation, an intermediate refractive index monomer (methyl methacrylate: the refractive index of the polymer was 1.492) and a high refractive index monomer (benzyl methacrylate: the refractive index of the polymer was 1.566). As a result, a copolymer region X made of a polymer produced from the intermediate refractive index monomer and the high refractive index monomer was formed with a thickness of 10 mm on the inner periphery of the outer region 31.

As for the mixing ratio of the intermediate refractive index monomer and the high refractive index monomer in the copolymer region X, the ratio of the intermediate refractive index monomer was higher in the outer part, and the ratio of the high refractive index monomer was higher in the inner part. The high refractive index monomer was not contained in a part adjacent to the outer region 31, the intermediate refractive index monomer was not contained in the innermost part of the copolymer region X, and the mixing ratio of the monomers varied continuously.

Then, a mixture was injected through the inlet in the same way as the above-described process. This mixture was a mixture of a polymerization initiator, a chain transfer agent for molecular weight regulation, and a high refractive index monomer (benzyl methacrylate: the refractive index of the polymer was 1.566). As a result, the center region 35 made of a polymer produced only from the high refractive index monomer was formed with a thickness of 28 mm on the inner periphery of the copolymer region X.

After that, the whole cylindrical container was cooled down to a room temperature, and then the cylindrical container was broken to take out the pipe 10. The pipe 10 is a cylindrical polymer with an outside diameter of 100 mm and an inside diameter of 4 mm.

By the above process, the pipe 10 having the outer region 31 made of the polymer produced only from the intermediate refractive index monomer (methyl methacrylate) with a refractive index of 1.492, the copolymer region X made of the polymer produced from the intermediate refractive index monomer (methyl methacrylate) and the high refractive index monomer (benzyl methacrylate: the refractive index of the polymer was 1.566), and the center region 35 made of the polymer produced only from the high refractive index monomer (benzyl methacrylate) with a refractive index of 1.566, sequentially from the outside, was manufactured. The pipe 10 was transparent in whole.

<Method for Manufacturing Optical Fiber>

A method for manufacturing the optical fiber 14 according to the comparative example 1 is described hereinafter. The plastic optical fiber 14 according to the comparative example 1 was obtained in the same way as in the example 1 except that the pipe 10 of the example 1 was replaced by the pipe 10 of the comparative example 1. The diameter of the core of the optical fiber 14 according to the comparative example 1 was 600 μm, and the cladding thickness was 100 μm.

<Method for Manufacturing Image Fiber>

A method for manufacturing the image fiber 1 according to the comparative example 1 is described hereinafter. The plastic image fiber 1 according to the comparative example 1 was obtained in the same way as in the example 1 except that the plastic optical fiber 14 of the example 1 was replaced by the plastic optical fiber 14 of the comparative example 1. The outside diameter of the image fiber 1 was 500 μm, the pixel diameter was 5 μm, the core diameter was 3 μm, and the cladding thickness was 0.5 μm.

Comparative Example 2

<Method for Manufacturing Optical Fiber Rod>

A method for manufacturing an optical fiber rod according to a comparative example 2 is described hereinafter. A glass cylindrical container (with an inside diameter of 100 mm) was placed horizontally in an air thermostat bath at a temperature of 70° C. The cylindrical container rotated (500 turns per minute). Under such conditions, a mixture was injected through an inlet at one end of the cylindrical container in the length direction. This mixture was a mixture of a polymerization initiator, a chain transfer agent for molecular weight regulation, and a low refractive index monomer (2,2,3,3-tetrafluoropropyl methacrylate: the refractive index of the polymer was 1.422).

The rate of injection of the mixture was adjusted so that the rate of deposition of a polymer was 1 mm per hour. After injection, the cylindrical container continued to rotate for three hours. After that, heating (at a temperature of 120° C. for three hours) was done. As a result, the outer region 31 made of a polymer produced only from the low refractive index monomer was formed with a thickness of 10 mm on the inner periphery of the cylindrical container.

Then, a mixture was injected through the inlet in the same way as the process of forming the outer region 31. This mixture was a mixture of a polymerization initiator, a chain transfer agent for molecular weight regulation, a low refractive index monomer (2,2,3,3-tetrafluoropropyl methacrylate: the refractive index of the polymer was 1.422) and a high refractive index monomer (benzyl methacrylate: the refractive index of the polymer was 1.566). As a result, a copolymer region Y made of a polymer produced from the low refractive index monomer and the high refractive index monomer was formed with a thickness of 10 mm on the inner periphery of the outer region 31.

As for the mixing ratio of the low refractive index monomer and the high refractive index monomer in the copolymer region Y, the ratio of the low refractive index monomer was higher in the outer part, and the ratio of the high refractive index monomer was higher in the inner part. The high refractive index monomer was not contained in a part adjacent to the outer region 31, the low refractive index monomer was not contained in the innermost part of the copolymer region Y, and the mixing ratio of the monomers varied continuously.

Then, a mixture was injected through the inlet in the same way as the above-described process. This mixture was a mixture of a polymerization initiator, a chain transfer agent for molecular weight regulation, and a high refractive index monomer (benzyl methacrylate: the refractive index of the polymer was 1.566). As a result, the center region 35 made of a polymer produced only from the high refractive index monomer was formed with a thickness of 28 mm on the inner periphery of the copolymer region Y.

After that, the whole cylindrical container was cooled down to a room temperature, and then the cylindrical container was broken to take out the pipe 10. The pipe 10 is a cylindrical polymer with an outside diameter of 100 mm and an inside diameter of 4 mm.

By the above process, the pipe 10 having the outer region 31 made of the polymer produced only from the low refractive index monomer (2,2,3,3-tetrafluoropropyl methacrylate) with a refractive index of 1.492, the copolymer region Y made of the polymer produced from the low refractive index monomer (2,2,3,3-tetrafluoropropyl methacrylate) and the high refractive index monomer (benzyl methacrylate), and the center region 35 made of the polymer produced only from the high refractive index monomer (benzyl methacrylate) with a refractive index of 1.566, sequentially from the outside, was manufactured. On the cross-section of the pipe 10, a circular whitish opaque region with a width of about 8 mm was present near a region with a radius of about 30 mm to 40 mm from the center.

Comparative Example 3

A method for manufacturing an optical fiber rod according to a comparative example 3 is described hereinafter. The pipe 10, which is the plastic optical fiber rod 30, was manufactured in the same way as in the example 1 except that the intermediate region 33 was not formed and the thickness of each of the second copolymer region 32 and the first copolymer region 34 was 5 mm. On the cross-section of the pipe 10 according to the comparative example 3, a circular whitish opaque region with a width of about 1 mm was present near a region with a radius of about 35 mm from the center. This whitish region was probably a region produced by the copolymerization of a monomer mixture containing 2,2,3,3-tetrafluoropropyl methacrylate, methyl methacrylate and benzyl methacrylate generated as a result that a monomer mixture containing benzyl methacrylate and methyl methacrylate dissolved the surface of the second copolymer region 32 when it began to be injected.

Comparison Between Example and Comparative Examples

Table 1 shows the monomer composition of the plastic optical fiber rod 30 according to the example 1 and the comparative examples 1 to 3. In Table 1, 4FMA is 2,2,3,3-tetrafluoropropyl methacrylate, MMA is methyl methacrylate, and BZMA is benzyl methacrylate.

TABLE 1

| | Monomer composition of each region | | | | |
|---|---|---|---|---|---|
| | Outer region | Second copolymer region/ Copolymer region X, Y | Intermediate region | First copolymer region | Center region |
| Example 1 | 4FMA | 4FMA AND MMA | MMA | MMA AND BZMA | BZMA |
| Comparative example 1 | MMA | MMA AND BZMA | N/A | N/A | BZMA |
| Comparative example 2 | 4FMA | 4FMA AND BZMA | N/A | N/A | BZMA |
| Comparative example 3 | 4FMA | 4FMA AND MMA | N/A | MMA AND BZMA | BZMA |

Table 2 shows the refractive index of each region of the plastic optical fiber rod 30 according to the example 1 and the comparative examples 1 to 3. Note that the refractive index in Table 2 is the refractive index for light with a wavelength of 587.6 nm, which is the same for Tables 4 and 5.

TABLE 2

| | Refractive index of each region | | | | |
|---|---|---|---|---|---|
| | Outer region | Second copolymer region/ Copolymer region X, Y | Intermediate region | First copolymer region | Center region |
| Example 1 | 1.422 | 1.422-1.492 | 1.492 | 1.492-1.566 | 1.566 |
| Comparative example 1 | 1.492 | 1.492-1.566 | N/A | N/A | 1.566 |
| Comparative example 2 | 1.422 | 1.422-1.566 | N/A | N/A | 1.566 |
| Comparative example 3 | 1.422 | 1.422-1.492 | N/A | 1.492-1.566 | 1.566 |

Table 3 shows the size of each region of the plastic optical fiber rod 30 according to the example 1 and the comparative examples 1 to 3. The size is in mm in Table 3. The thickness of each region is a material thickness on one side with respect to the central axis.

TABLE 3

| | Thickness of each region | | | | | |
|---|---|---|---|---|---|---|
| | Outer region | Second copolymer region/ Copolymer region X, Y | Intermediate region | First copolymer region | Center region | Outside diameter |
| Example 1 | 10 | 4 | 2 | 4 | 28 | 100 |
| Comparative example 1 | 10 | 10 | N/A | N/A | 28 | 100 |

TABLE 3-continued

| | Thickness of each region | | | | |
|---|---|---|---|---|---|
| Outer region | Second copolymer region/ Copolymer region X, Y | Intermediate region | First copolymer region | Center region | Outside diameter |
| Comparative example 2 | 10 | 10 | N/A | N/A | 28 | 100 |
| Comparative example 3 | 10 | 5 | N/A | 5 | 28 | 100 |

Table 4 shows the specifications of the plastic optical fiber according to the example 1 and the comparative example 1. In Table 4, the size is in μm, and Δn is a difference in refractive index between the center region 35 and the outer region 31. The core diameter is a diameter. The core ratio is the area ratio of the core to the optical fiber.

TABLE 4

| | Optical fiber diameter | Core diameter | Cladding thickness | Δn | Core ratio |
|---|---|---|---|---|---|
| Example 1 | 1000 | 600 | 100 | 0.144 | 36% |
| Comparative example 1 | 1000 | 600 | 100 | 0.074 | 36% |

Table 5 shows the specifications and evaluation results of the plastic image fiber 1 according to the example 1 and the comparative example 1. In Table 5, the size is in μm, Δn is a difference in refractive index between the center region 35 and the outer region 31, and the core ratio is the area ratio of the core to the pixel.

TABLE 5

| | Image fiber diameter | Number of pixels | Core diameter a | Cladding thickness t | Pixel diameter d | Δn | Core ratio | Crosstalk |
|---|---|---|---|---|---|---|---|---|
| Example 1 | 500 | 7900 | 3 | 0.5 | 5 | 0.144 | 36% | Small |
| Comparative example 1 | 500 | 7900 | 3 | 0.5 | 5 | 0.074 | 36% | Large |

The plastic image fiber 1 according to the example 1 and the comparative example 1 was cut into pieces with a length of 1 m each, the both end surfaces were polished, and an eyepiece was attached to one end surface, thereby producing two fiberscopes. The resolution of those fiberscopes was evaluated. The evaluation of the resolution was done by observing, with the fiberscopes, a chart of various sizes where a plurality of black lines were aligned in parallel at the ratio of width 1 and interval 2.

With the fiberscope using the image fiber 1 according to the example 1, it was possible to observe the chart with a minimum interval of 10 μm with high resolution; however, with the fiberscope using the image fiber 1 according to the comparative example 1, it was only possible to observe the chart with a minimum interval of 20 μm with high resolution.

It should be noted that the present invention is not limited to the above-described exemplary embodiment and may be varied in many ways within the scope of the present invention. For example, the optical fiber rod is not limited to a cylindrical shape or a columnar shape, and its cross section may be oval or polygonal.

This application is based upon and claims the benefit of priority from Japanese patent application No. 2014-262155, filed on Dec. 25, 2014, the disclosure of which is incorporated herein in its entirety by reference.

INDUSTRIAL APPLICABILITY

It is possible to provide an optical fiber rod, an optical fiber, an image fiber, and an optical fiber rod manufacturing method with a large difference in refractive index between a core and a cladding and a small optical transmission loss.

REFERENCE SIGNS LIST

1 IMAGE FIBER
2 CLADDING
3 CORE
10 PIPE
12, 18 FURNACE
13, 19 ROLLER
14 OPTICAL FIBER
15 CUTTER
16 POLYMETHYLMETHACRYLATE PIPE
17 BUNDLE
30 OPTICAL FIBER ROD
31 OUTER REGION
32 SECOND COPOLYMER REGION
33 INTERMEDIATE REGION
34 FIRST COPOLYMER REGION
35 CENTER REGION

The invention claimed is:
1. An optical fiber rod, comprising:
a center region;
an outer region formed around the center region; and
an intermediate region formed between the center region and the outer region, wherein:
nA>nB>nC is satisfied where nA is a refractive index of a material A produced by polymerization of a monomer ma, nB is a refractive index of a material B produced by polymerization of a monomer mb, and nC is a refractive index of a material C produced by polymerization of a monomer mc,
the center region is made of a material produced by polymerization of a monomer mixture containing the monomer ma and not containing the monomer mc,
the outer region is made of a material produced by polymerization of a monomer mixture containing the monomer mc and not containing the monomer ma,
the intermediate region is made of a material produced by polymerization of a monomer mixture containing the monomer mb and not containing the monomer ma and the monomer mc, a refractive index decreases in the order: the center region >the intermediate region >the outer region;

when the diameter of the optical fiber rod is 100, a diameter of the center region is 40 to 80, and a width of the outer region is 5 to 55, and the intermediate region is at the midpoint between the outermost periphery of the center region and the innermost periphery of the outer region.

2. The optical fiber rod according to claim 1, further comprising:

a first copolymer region formed between the center region and the intermediate region, wherein the first copolymer region is made of a material produced by copolymerization of a monomer mixture comprising the monomer ma and the monomer mb and not containing the monomer mc.

3. The optical fiber rod according to claim 2, wherein a refractive index of the first copolymer region continuously decreases from the center region side toward the intermediate region side.

4. The optical fiber rod according to claim 1, further comprising:

a second copolymer region formed between the intermediate region and the outer region, wherein the second copolymer region is made of a material produced by copolymerization of a monomer mixture comprising the monomer mb and the monomer mc and not containing the monomer ma.

5. The optical fiber rod according to claim 4, wherein a refractive index of the second copolymer region continuously decreases from the intermediate region side toward the outer region side.

6. An optical fiber manufactured by stretching the optical fiber rod according to claim 1.

7. An image fiber manufactured by stretching a bundle of a plurality of optical fibers according to claim 6.

8. A method for manufacturing an optical fiber rod including a center region, an outer region formed around the center region, and an intermediate region formed between the center region and the outer region, where a refractive index decreases in the order: the center region >the intermediate region >the outer region, and nA>nB>nC is satisfied where nA is a refractive index of a material A produced by polymerization of only a monomer ma, nB is a refractive index of a material B produced by polymerization of only a monomer mb, and nC is a refractive index of a material C produced by polymerization of only a monomer mc, when the diameter of the optical fiber rod is 100, a diameter of the center region is 40 to 80, and a width of the outer region is 5 to 55, and the intermediate region is at the midpoint between the outermost periphery of the center region and the innermost periphery of the outer region, the method comprising:

forming the outer region by polymerization of a monomer mixture comprising the monomer mc and not containing the monomer ma;

forming the intermediate region on an inside of the outer region by polymerization of a monomer mixture comprising the monomer mb and not containing the monomer ma and the monomer mc; and forming the center region on an inside of the intermediate region by polymerization of a monomer mixture comprising the monomer ma and not containing the monomer mc.

9. The optical fiber rod according to claim 2, further comprising:

a second copolymer region formed between the intermediate region and the outer region, wherein the second copolymer region is made of a material produced by copolymerization of a monomer mixture comprising the monomer mb and the monomer mc and not containing the monomer ma.

10. The optical fiber rod according to claim 9, wherein a refractive index of the second copolymer region continuously decreases from the intermediate region side toward the outer region side.

11. A method of manufacturing an optical fiber rod, comprising:

stacking monomers on an inner surface of a rotating cylindrical reaction container by injecting a polymerization composition through an inlet at one end of the rotating cylindrical reaction container in a length direction, wherein the monomers are stacked atop one another sequentially toward an inner side, wherein a composition of the monomers changes continuously or intermittently during the stacking such that the resulting optical fiber rod is transparent and has an outer region having low refractive index and a central region having high refractive index.

12. A method of manufacturing an optical fiber, comprising:

heating an optical fiber rod produced by the method of claim 11, and pressing and drawing the heated optical fiber rod between a pair of rollers to form the optical fiber.

13. A method for manufacturing an image fiber, comprising:

placing a plurality of optical fibers produced according to claim 12 inside a pipe formed of a transparent thermoplastic resin, wherein the plurality of optical fibers are arranged inside the pipe in parallel to one another to form a bundle; and heating and stretching the bundle.

14. The image fiber of claim 7, wherein the image fiber has a sea-island structure having a plurality of cores placed separately from one another in a cladding, wherein the cladding is one continuous form, such that a number of cores forming the image fiber is 1000 or more, each core has a diameter of 1 μm or more and 20 μm or less, a width of the cladding is 0.2 μm or more and 2.0 μm or less, and an outside diameter of the image fiber is 0.2 mm or more and 4 mm or less.

* * * * *